United States Patent [19]

Nicodemus et al.

[11] 3,772,455

[45] Nov. 13, 1973

[54] FLAME AND MOISTURE RESISTING IMPREGNATING COMPOSITION FOR FIBROUS MATERIALS, AND PRODUCTS THEREOF

[75] Inventors: Paul Otis Nicodemus; Henry Lewis Wilson, both of Chelmsford, Mass.

[73] Assignee: General Electric Company, New York, N.Y.

[22] Filed: Dec. 22, 1972

[21] Appl. No.: 317,691

[52] U.S. Cl........ 174/121 A, 117/137, 174/121 SR, 252/8.1
[51] Int. Cl. ............................................. H01b 7/28
[58] Field of Search ................... 174/121 R, 121 A, 174/121 SR; 117/137, 138; 252/8.1

[56] References Cited
UNITED STATES PATENTS
2,335,097  11/1943  Aken .............................. 174/121 A FOREIGN PATENTS OR APPLICATIONS
844,174  6/1970  Canada ........................... 174/121 A Primary Examiner—E. A. Goldberg
Attorney—Raymond G. Simkins et al.

[57] ABSTRACT

This disclosure includes a novel composition comprising a combination of halogenated rubber and polyphenyl with hydrated alumina and antimony trioxide for the impregnation of fibrous materials and imparting thereto resistance to flame and moisture; the flame and moisture resisting fibrous products which have been impregnated with said composition; and, improved insulated electrical conductors comprising combinations of polymeric materials and inorganic fibers which have been treated with the impregnating composition.

19 Claims, 1 Drawing Figure

PATENTED NOV 13 1973
3,772,455
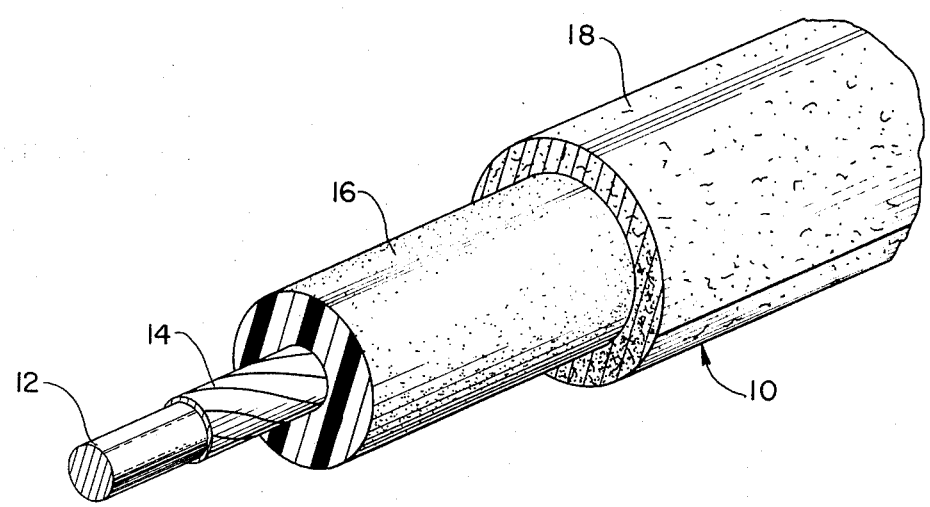

FLAME AND MOISTURE RESISTING IMPREGNATING COMPOSITION FOR FIBROUS MATERIALS, AND PRODUCTS THEREOF

BACKGROUND OF THE INVENTION

Electrical conducting power and control wires for service in electrical appliances containing heating elements, such as electric ranges, ovens, rotisseries and hot plates, and especially appliances with electrical heating elements which routinely encounter high moisture conditions such as clothes dryers and dishwashers, must possess good electrical properties together with a high level of resistance to elevated temperatures, flame and moisture. Underwriters' Laboratories, Inc., for example, has set a requirement of a 150°C operating temperature rating for wires used in many such applications.

Due to its resistance to high temperatures and/or flame, asbestos fiber has traditionally been applied about the electrical insulations on power wires for heating appliances as a covering protective measure despite the relative poor electrical and moisture resisting properties of asbestos. Moreover, notwithstanding continuing efforts over the years by the asbestos and electrical industries to remedy the deficiencies of asbestos in electrical services, its fibrous structure and chemical make up which normally includes iron and other conductive impurities in varying amounts, and its highly hygroscopic nature have persistently presented problems or impediments in electrical service. These weaknesses of asbestos in electrical applications are especially critical in the more demanding conditions incurred with appliances such as clothes dryers and dishwashers wherein repeated and prolonged exposure to heat and moisture are normally encountered.

Various aspects of these inherent deficiencies of asbestos in electrical service have been dealt with in the prior art, for example, in U.S. Pat. Nos. 2,335,097 and 2,382,423, and in APC application Ser. No. 321,131, filed Feb. 2, 1940 and published May 18, 1943.

SUMMARY OF THE INVENTION

This invention comprises a novel impregnating composition for inorganic fibers such as asbestos and glass, which composition itself possesses and imparts to such fibers improved and lasting resistance to high temperatures or flame and to moisture, and products formed therewith. This composition thus renders inorganic fibers more serviceable in electrical applications such as in insulations or coverings for electrical power and control wires and cables for use in locations subjected to conditions of high heat and moisture. In particular the invention comprises insulated electrical conductors which possess outstanding resistance to heat or flame and to moisture notwithstanding the presence of asbestos or other inorganic fibers, among other improved attributes required for electrical service.

The electrical insulations of this invention will effectively and safely perform under and endure rigorous service conditions including extended periods of service at about 150°C (302°F) and under high moisture or saturated humidity conditions, and also the repeated cycling between such conditions of temperature and moisture and normal ambient conditions resulting from routine on-off operation over a period of years such as is encountered with the normal performance of household or commercial clothes dryers and dishwasher appliances.

The impregnating composition of this invention comprises a combination of basic ingredients including halogenated rubber, halogenated polyphenyl, hydrated alumina, halogenated phthalic anhydride, and antimony trioxide. The insulated electrical conductor of the invention includes a metallic conductor having thereon a composite insulation or covering comprising the combination of a typical dielectric and thermoset polymer composition such as cross-linked polyethylene surrounding the conductor and a covering thereover of a layer of inorganic fibers such as asbestos which have been substantially saturated with the impregnating composition.

OBJECTS OF THE INVENTION

It is a primary object of this invention to provide a novel composition which will impart effective and lasting resistance to heat or flame and moisture to fibrous materials.

It is a further object of this invention to render asbestos or inorganic fibers, and products comprising same, resistant to moisture or water whereby the electrical properties of such fibrous materials will not be impaired or diminished by exposure to moisture or water, and which produces such resistance thereto without detracting from their resistance to flame or high temperature.

It is also an object of this invention to provide a heat, flame and moisture resisting impregnating composition and treatment for asbestos or other mineral fibers components in insulations or coverings for electrical conductors which maintain its physical integrity, flexibility and tack free consistency upon exposure to high temperatures over extended periods, and which does not soften and become sticky, deform or flow when hot.

It is a specific object of this invention to provide insulated electrical power or control wires and cables which will provide effective and lasting service in household and commercial appliances containing electrical heating elements and specifically those appliances which normally encounter excessively high moisture conditions such as clothes dryers and dishwashers.

It is also a specific object of this invention to provide insulated electrical power or control wires and cables for appliances and other services which has lasting resistance to temperature in the order of 150°C and very high ambient moisture or saturated humidity condition and will effectively perform over the years while regularly subjected to repeated cycles between such severe conditions of temperature and moisture, and ambient or room conditions as is encountered in the on-off service of appliances.

It is an additional object of this invention to provide insulated electrical wire and cable which is not unpleasant or harsh to handle or work with, and is easily strippable and flexible for efficient wiring installation or replacement, and does not become embrittled or soft and sticky or deform upon prolonged and repeated exposure to high temperatures and moisture.

BRIEF DESCRIPTION OF THE DRAWING

The FIGURE comprises a perspective view of a section of an insulated electrical conductor constructed according to this invention.

DESCRIPTION OF A PREFERRED EMBODIMENT

The impregnating composition of this invention for the treatment of asbestos and other inorganic fibers, comprises the combination of the following ingredients in the approximate relative ranges given in parts by weight.

| | |
|---|---|
| Halogenated rubber | 15–25 |
| Halogenated polyphenyl | 25–35 |
| Hydrated alumina | 30–40 |
| Halogenated phthalic anhydride | 3–9 |
| Antimony trioxide | 3–9 |
| Phosphate ester | 0–9 |
| Aluminum stearate | 0–1 |

The halogenated rubber component for use in this invention comprises common elastomers which have been chlorinated, fluorinated, or brominated, including halogenated natural rubber, styrene butadiene, butyl, ethylene-propylene coplymers and terpolymers, neoprene, and polymers such as chlorinated polyethylene or chlorosulfonated polyethylene. Preferably the halogen containing rubber is stabilized with a lead containing compound such as basic lead silicate, lead phthalates, lead chlorosilicate complex, lead oxide, to inhibit to evolution of HC1 at elevated temperature. Depending upon the flexibility of the particular rubber used, it may be desirable to include a plasticizer with the rubber, according to conventional practice.

Suitable halogenated polyphenyls comprise hexabromo biphenyl, chlorinated triphenyl, and tetrabromo through octobromo biphenyls. The halogenated phthalic anhydrides include generally inert and insoluble, heat stable chlorinated or brominated anhydrides comprising tetrabromo phthalic anhydride and tetrachloro phthalic anhydride.

Although not required, the inclusion of minor amounts of a phosphate ester is preferred to enhance flame resistance and to impart flexibility. These esters include tri phosphate esters, tricresyl phosphate, tris (2,3–dibromopropyl) phosphate and other halogenated phosphate esters.

The hydrated alumina consists of a well known, high surface area hydrated alumina oxide which is described in detail in U.S. Pat. No. 2,888,424 and elsewhere in the art.

Aluminum stearate is preferably included in slight amounts to inhibit settling of the solid ingredients and to facilitate their redispersion. Other long chain fatty acid salts can serve in this function.

Primarily for purposes of the preparation and effective application of the heat and moisture resisting composition of the invention, the specified ingredients thereof are dispersed in a liquid medium or vehicle comprising a volatile organic solvent such as toluene, xylene or other appropriate solvents for the rubber and phenyl components, including chlorinated hydrocarbon solvents such as chloroform and carbon tetrachloride. Preferably to facilitate the dispersing of the components within the solvent medium, the soluble halogenated rubber and polyphenyl are first dissolved, followed by the other soluble components, and the insoluble components such as the phthalic anhydride, and hydrated alumina and antimony trioxide are thereafter slurried through the liquid medium by ball milling into the rubber and phenyl solution. The preparation of the dispersion is also preferably effected at a high concentration of the ingredients, and it is thereafter diluted with the addition of more solvent to achieve the most effective impregnating conditions for the particular fiber or their form. Concentrations of from about 25 to 200 parts of dispersing liquid or vehicle per 100 parts by weight of the composition ingredients are generally suitable for the treatment of most fibrous bodies, and preferably about 75 to 175 parts of dispersing liquid or vehicle per 100 parts by weight of the composition ingredients for asbestos materials or other inorganic fibers.

A typical impregnating composition of the invention comprises in relative parts by weight and in percent by weight.

| | Parts By Weight | Percent |
|---|---|---|
| Chlorinated rubber | 23.0 | 15.0 |
| Hexabromo diphenyl | 28.0 | 19.4 |
| Hydrated alumina | 36.7 | 24.2 |
| Tetrabromo phthalic anhydride | 6.0 | 3.9 |
| Antimony trioxide | 6.0 | 3.9 |
| Aluminum stearate | 0.3 | 0.2 |
| Toluene | — | 33.4 |

The composition of this invention is intended for the treatment and enhancement of fibers of inorganic compositions generally, including articles embodying such fibers and products fabricated therefrom, wherein it is desired to impart resistance to moisture and other attributes without detracting from their inherent temperature or flame resistance. Such fibers include asbestos, glass fibers, refractory fibers primarily composed of alumina and silica, and the so-called mineral wools derived from fiberized metallurgical slags or argillaceous material.

However because of the high degree of moisture sensitivity of asbestos due to its hygroscopic nature and the resulting degradation of its electrical properties, this invention is particularly designed for the treatment of asbestos and provides a highly effective means of overcoming this major deficiency of asbestos in electrical service without detracting from its attributes.

This invention accordingly includes a new insulated electrical power or control wire or cable comprising a metallic conductor, a heat resistant or thermoset polymeric insulation about the conductor, and a flame and moisture resisting body of inorganic fibers impregnated with the composition. This overall combination of components and the ingredients thereof produces an insulated electrical conductor with an improved sum of properties which are especially advantageous in given types of service such as power and control wiring in household and commercial appliances which encounter high temperature and moisture conditions such as ranges, dishwashers, and clothes dryers.

Typical insulated wires or cables of the preferred construction of this invention are illustrated in the drawing as a section of insulated conductor 10. The metallic electrical conductor 12 is shown with a commonly employed paper or plastic wrap or separator 14 helically wrapped thereabout. The primary electrical insulation 16 comprises a polymeric material of good dielectric properties. Overlying the insulation 16 is a covering or surrounding layer composed of a body of inorganic fibers composed of asbestos impregnated with the composition of the invention and shown as 18.

The metallic conductor 12 may comprise either a single solid wire or a bundle or braid of several strands.

The primary electrical insulation 16 may be composed of any polymeric material having good dielectric properties and which is or can be rendered resistant to heat or thermoset by curing so as to impede softening and deformation or flow at high temperature. Also, the polymeric material can be filled or unfilled.

However, in the preferred embodiment of this invention the primary insulation comprises a cross-link cured ethylene containing polymer such as homopolymers of ethylene, copolymers of ethylene and other polymerizable materials, and blends of polyethylene and other polymers. Suitable copolymers of ethylene include, for example, ethylene-propylene copolymers and terpolymers, ethylene-vinyl acetate, ethylene acrylate wherein the copolymer contains at least 50 percent and preferably about 70 to 90 percent by weight of ethylene. The proportion of ethylene in the copolymers will somewhat alter the physical properties of the polymeric material and therefore may be varied within the specified amounts to achieve the properties desired. Also the ethylene containing polymers may be blended with one or more other polymers such as ethylene-propylene copolymers or terpolymers. In the preferred embodiment the primary insulation is formed of a filled, cross-linked polyethylene.

Suitable filler can be compounded with the polymeric material to increase the strength of the composition and thereby improve its handleability during fabrication or extrusion onto the metal conductor. The fillers used in the composition may be any of those commonly employed in polymeric materials for electrical service and include mineral filters and carbon black. The common mineral fillers comprise aluminum silicate, aluminum oxide, calcium silicate, magnesium silicate, silica, titanium dioxide, and mixtures thereof. The roll of filler in polymeric insulating materials is known, and the type of filler used, if any, and the amount incorporated into the polymer may be varied depending upon the properties desired. When used, the filler content generally ranges from about 20 to 50 percent by weight of the polymeric composition, and preferably about 25 to 35 percent thereof.

Also certain additives are commonly compounded with the polymeric material, such as antioxidants, for example, polymerized trimethydihydroquinoline; lubricants such as stearic acid to prevent sticking during fabrication; co-agents such as polybutadiene to facilitate cross-linking.

The polymeric material of the primary insulation can be cured by cross-linking to a thermoset condition by any available means, including irradiation, but preferably by chemical means through the introduction of a suitable curing agent. Effective curing agents for ethylene containing polymers comprise free radial forming organic peroxides, such as tertiary peroxides characterized by at least one unit of the structure

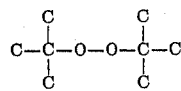

which is activated by its decomposition at temperatures in excess of about 295°F. The use of such peroixide curing agents to effect cross-linking of ethylene containing polymers is described in detail in U.S. Pat. Nos. 3,079,370; 2,888,424; 3,086,966 and 3,214,422. A commonly used and preferred curing agent is di-α-cumyl peroxide. Other useful peroxide curing agents include the tertiary diperoxides such as 2.5-dimethyl-2,5 (t-butyl peroxy) hexane, and 2,5-dimethyl-2,5 di(t-butyl peroxy) hexyne-3, and the like diperoxy compounds. The amount of peroxide curing agent used depends substantially upon the mechanical properties sought in the cured polymer, such as hot tensile strength. Amounts ranging from about 0.5 to 10 parts of peroxide per 100 parts by weight of polymer fulfill most requirements, and a typical amount is about 2 to 4 parts of peroxide.

A specific illustration of an electrical conductor of this invention designed for use as an internal power wire in electrical ranges, dishwashers, water heaters and clothes dryers, is as follows: A primary insulation comprising a blended polymeric compound in approximate relative parts by weight of: polyethylene – 68.69; polymerized 1,2-dihydro-2,2,4-trimethylquinoline antioxidant – 1.37; carbon black filler – 27.50; and di-α-cumyl peroxide curing agent – 2.44; was extruded about a stranded copper conductor, No. 12 AWG, having a helical paper separator wrap thereabout. The polymeric composition was formed about the conductor in a wall thickness of about 25 mils, and passed through a steam chamber at about 397°F and 225 psig to effect the cure of the polymer.

The cured polymer covered wire conductor was then passed through a textile carding machine and a layer of carded chrysotile asbestos fiber was formed over the cured polymer in a thickness of about 15 mils. The wire was next passed through a liquid dispersion or slurry of the impregnating composition of this invention comprising the following ingredients in relative parts by weight dissolved or dispersed in about 147 parts of toluene per 100 parts by weight of the composition ingredients:

|  | Parts By Weight | Percent |
| --- | --- | --- |
| Chlorniated natural rubber | 17.7 | 7.1 |
| Tricresyl phosphate | 5.9 | 2.4 |
| Hexabromo diphenyl | 29.3 | 11.7 |
| Hydrated alumina | 35.0 | 14.0 |
| Tetrabromo phthalic anhydride | 5.9 | 2.4 |
| Antimony trioxide | 5.9 | 2.4 |
| Aluminum stearate | 0.3 | 0.1 |
| Toluene | — | 59.9 |

Following the saturation of the chrysotile fiber, the wire was heated in an oven to accelerate the evaporation of the toluene, and samples of the product were examined and tested by the Underwriters' Laboratories standards. The wire product was very flexible, easily strippable, and had a dry and tack free feel that did not soften or become sticky upon long exposure to both high temperatures and humidity.

The following comprises physical and electrical properties of the wire.

Physical properties were determined according to the methods described in Underwriters' Laboratories, Inc. Standards for Flexible Cord and Fixture Wire, 7th edition, dated March, 1962. Although this test specifies aging the insulated wire with the asbestos removed, the physical properties of the wire were evaluated by aging both with and without the asbestos covering. The results are as follows:

|  | Original | | After 15 Days at 158°C | | | |
| --- | --- | --- | --- | --- | --- | --- |
|  |  |  | Asbestos On | | Asbestos Off | |
|  | Range | Nominal | Range | Nominal | Range | Nominal |
| Tensile Strength (psi) | 1800–2200 | 2000 | 1500–2100 | 1800 | 1900–2300 | 2200 |
| % Retention of Original |  |  | 90–120 | 100 | 100–120 | 110 |
| Elongation (%) | 250– | 275 | 180– | 225 | 190– | 240 |

| % Retention of Original | 310 | 275 60–90 | 70 | 275 65–90 | 80 |

To test for dielectric strength, several lengths of finished wire, including both unaged and heat aged one-eighth were flexed for five complete turns around a mandrel of about five times the diameter of the wire, allowing one-eight inch spacing between the turns. The wire was covered with metal foil. A gradually increasing AC potential held for one minute. The potential was then raised to breakdown. Breakdown potentials in volts of the wire were:

| Wire Samples | Breakdown Voltage Range | Nominal |
|---|---|---|
| As received | 11,000–14,000 | 12,000 volts |
| Aged 90 days at 158°C (tested at room temp.) | 1,200–7,500 | 2,000 volts |

A test for dripping of the composition was conducted by suspending vertically short lengths of the finished wire in an oven maintained at 150°C for one hour over a sheet of white asbestos. At the end of one hour there was no evidence of any dripping of the impregnated composition from the suspended wire.

In a cold-bend test, lengths of the finished wire were cooled in a chamber maintained at −10°C for one hour, after which the wires were tightly wound for six complete turns around a mandrel one-fourth inch in diameter. The insulation did not crack as a result of this test.

The wire product of this invention passed the Underwriters' Laboratories vertical flame test as described in US Subject 115 "Standard For Asbestos & Asbestos-Varnished Cloth Insulated Wires" a minimum of 80 percent of tests when ten or more specimens of a given sample were subjected to the tests.

The wire product of this invention passed the Underwriters' Laboratories horizontal flame test as described in US Subject 44 "Standard For Rubber-Insulated Wires and Cables" one hundred percent of the specimen tested.

Although the invention has been described with reference to certain specific embodiments thereof, numerous modifications are possible and it is desirable to cover all modifications falling within the spirit and scope of this invention.

What we claim as new and desire to secure by Letters Patent of the United States is:

1. An impregnating composition for fibrous materials which imparts thereto resistance to flame and moisture, consisting of an organic solvent dispersion comprising the following ingredients in the approximate relative ranges in parts by weight of:

| Halongenated rubber | 15–25 |
|---|---|
| Halogenated polyphenyl | 25–35 |
| Hydrated alumina | 30–40 |
| Halogenated phthalic anhydride | 3–9 |
| Antimony trioxide | 3–9 |
| Phosphate ester | 0–9 |
| Aluminum stearate | 0–1 |

2. The impregnating composition of claim 1, dispersed in about 25 to 200 parts of organic solvent per 100 parts by weight of composition ingredients.

3. The impregnating composition of claim 1, wherein the halogenated polyphenyl is selected from the group consisting of hexabromo biphenyl, tetrabromo biphenyl, octobromo biphenyl, and chlorinated triphenyl, and mixtures thereof.

4. The impregnating composition of claim 1, wherein the phosphate ester is selected from the group consisting of tricresyl phosphate, and tris (2,3-dibromophropyl) phosphate.

5. The impregnating composition of claim 1, consisting of an organic solvent dispersion comprising the ingredients in the approximate parts by weight of:

| Chlorinated rubber | 17.7 |
|---|---|
| Tricresyl phosphate | 5.9 |
| Hexabromo diphenyl | 29.3 |
| Hydrated alumina | 35.0 |
| Tetrabromo phthalic anhydride | 5.9 |
| Antimony trioxide | 5.9 |
| Aluminum stearate | 0.3 ps |

6. The impregnating composition of claim 5, dispersed in about 75 to 175 parts of toluene per 100 parts by weight of the composition ingredients.

7. The impregnating composition of claim 1, consisting of an organic solvent dispersion comprising the ingredients in the approximate parts by weight of:

| Chlorinated rubber | 23.0 |
|---|---|
| Hexabromo diphenyl | 28.0 |
| Hydrated Alumina | 36.7 |
| Tetrabromo phthalic anhydride | 6.0 |
| Antimony trioxide | 6.0 |
| Aluminum stearate | 0.3 |

8. The impregnating composition of claim 7, dispersed in about 75 to 175 parts of toluene per 100 parts by weight thereof.

9. A flame and moisture resisting fibrous body comprising a mass of inorganic fibers impregnated with a flame and moisture resisting composition comprising the following ingredients in the approximate relative ranges in parts by weight of:

| Halogenated rubber | 15–25 |
|---|---|
| Halogenated polyphenol | 25–35 |
| Hydrated alumina | 30–40 |
| Halogenated phthalic anhydride | 3–9 |
| Antimony trioxide | 3–9 |
| Phosphate ester | 0–9 |
| Aluminum stearate | 0–1 |

10. The flame and moisture resisting fibrous body of claim 9, wherein the fibers comprise asbestos fiber.

11. The flame and moisture resisting fibrous body of claim 10, wherein the halogenated polyphenyl of the impregnating composition is selected from the group consisting of hexabromo biphenyl, tetrabromo biphenyl, octobromo biphenyl, and chlorinated triphenyl, and mixtures thereof.

12. The flame and moisture resisting fibrous body of claim 10, wherein the phosphate ester is selected from the group consisting of tricresyl phosphate, and tris (2,3-dibromopropyl) phosphate, and mixtures thereof.

13. An electrical conductor having a flame and moisture resisting insulating covering thereon, comprising the combination of: a) a metallic electrical conductor; b) a thermoset polymeric insulation about the said metallic electrical conductor; and c) a flame and moisture resisting body of inorganic fibers surrounding the said thermoset polymeric insulation comprising inorganic fibers impregnated with a flame and moisture resisting composition comprising the following ingredients in the approximate relative ranges in parts by weight of:

| Halogenated rubber | 15–25 |
|---|---|
| Halogenated polyphenol | 25–35 |
| Hydrated alumina | 30–40 |
| Halogenated phthalic anhydride | 3–9 |

| | |
|---|---|
| Antimony trioxide | 3–9 |
| Phosphate ester | 0–9 |
| Aluminum stearate | 0–1 |

14. The electrical conductor of claim 13, wherein the inorganic fibre comprises asbestos fiber.

15. The electrical conductor of claim 14, wherein the thermoset polymeric insulation contains a filler.

16. The electrical conductor of claim 15, wherein the thermoset polymeric insulation comprises an ethylene containing polymer selected from the group consisting of homopolymers of ethylene, copolymers of ethylene and other polymerizable materials, and blends of polyethylene and other polymers.

17. The electrical conductor of claim 16, wherein the halogenated polyphenyl is selected from the group consisting of hexabromo biphenyl, tetrabromo biphenyl, octobromo biphenyl, and chlorinated triphenyl, and mixtures thereof.

18. The electrical conductor of claim 17, wherein the phosphate ester is selected from the group consisting of tricresyl phosphate, and tris (2,3-dibromopropyl) phosphate, and mixtures thereof.

19. The electrical conductor of claim 18, wherein the flame and moisture resisting composition comprised in approximate parts by weight:

| | |
|---|---|
| Chlorinated rubber | 17.7 |
| Tricresyl phosphate | 5.9 |
| Hexabromo diphenyl | 29.3 |
| Hydrated alumina | 35.0 |
| Tetrabromo phthalic anhydride | 5.9 |
| Antimony trioxide | 5.9 |
| Aluminum stearate | 0.3 |

* * * * *

PC-1050
(5/69)

UNITED STATES PATENT OFFICE
CERTIFICATE OF CORRECTION

Patent No. 3,772,455            Dated 11/13/73

Inventor(s) P. O. Nicodemus and H. L. Wilson

It is certified that error appears in the above-identified patent and that said Letters Patent are hereby corrected as shown below:

Column 8, line 14,           delete "ps"

Column 8, line 14           "6. The impregnating composition of claim 5, dispersed in about 75 to 175 parts of toluene per 100 parts by weight of the composition ingredients."
- Should appear in claim format -

Column 9, line 5           "fibre" should be - fiber -

Signed and sealed this 2nd day of April 1974.

(SEAL)
Attest:

EDWARD M. FLETCHER, JR.           C. MARSHALL DANN
Attesting Officer           Commissioner of Patents